United States Patent [19]
Jenkins

[11] Patent Number: 5,239,296
[45] Date of Patent: Aug. 24, 1993

[54] METHOD AND APPARATUS FOR RECEIVING OPTICAL SIGNALS USED TO DETERMINE VEHICLE VELOCITY

[75] Inventor: Charles S. Jenkins, Suwanee, Ga.

[73] Assignee: Black Box Technologies, Norcross, Ga.

[21] Appl. No.: 781,411

[22] Filed: Oct. 23, 1991

[51] Int. Cl.⁵ .......................... G08G 1/01; G01S 7/36
[52] U.S. Cl. ................... 340/936; 340/942; 340/555; 340/557; 342/20; 342/104; 359/145; 356/28
[58] Field of Search ............... 340/936, 435, 901–904, 340/555–557, 942; 342/20, 53, 54, 104; 359/142, 145, 146, 174, 155; 356/5, 28, 28.5

[56] References Cited

U.S. PATENT DOCUMENTS

| | | | |
|---|---|---|---|
| 3,911,433 | 10/1975 | Redman | 342/53 |
| 3,924,232 | 12/1975 | Burdi et al. | 342/20 |
| 4,019,056 | 4/1977 | Block et al. | 250/344 |
| 4,290,047 | 9/1981 | Latta, Jr. | 340/432 |
| 4,674,073 | 6/1987 | Naruse | 340/904 |
| 4,723,314 | 2/1988 | Schneeberger | 455/619 |
| 4,809,359 | 2/1989 | Dockery | 359/174 |
| 4,841,284 | 6/1989 | Biersdorff | 340/567 |
| 4,864,647 | 9/1989 | Harrington | 359/176 |
| 4,882,491 | 11/1989 | Tamura et al. | 250/338.3 |
| 4,904,607 | 2/1990 | Riglet et al. | 437/3 |
| 4,906,834 | 3/1990 | Quad et al. | 250/214 A |
| 4,935,742 | 6/1990 | Marin | 342/13 |
| 4,960,995 | 10/1990 | Neumann et al. | 250/347 |
| 4,967,081 | 10/1990 | Quad et al. | 250/338.1 |

OTHER PUBLICATIONS

Leaflet on "ProLaser" manufactured by Kustom Signals, Inc. (4 pages), printed Jun. 1991.
Article in *Law and Order*, Jul. 1991, pp. 42–43.
Newspaper article entitled "Catching Speeders Now High-Tech" by Barry Meier Oct. 23, 1991.

*Primary Examiner*—Donnie L. Crosland
*Attorney, Agent, or Firm*—Nixon & Vanderhye

[57] ABSTRACT

Optical receiving system (20) and method are provided for receiving optical signals used to determine vehicle velocity. The receiver system (20) comprises an optical receiver unit (22) mounted on a vehicle (30) to detect an optical signal incident thereupon. The optical receiver unit (22) includes a radio frequency transmitter (44) for generating and transmitting a radio frequency signal when the optical receiver unit (22) detects an optical signal incident thereupon. The detector system further comprises an indicator unit (24) which includes a radio receiver (46) for receiving the radio frequency generated by the radio frequency transmitter (44) and for providing an indication of the reception thereof. In one embodiment, the indicator unit is a convention radar detection device. In one embodiment, a plurality of optical receiver units (22') are provided for positioning at differing locations upon a vehicle (30'). In another embodiment, a linear array (122) of optical receivers is provided. The radio frequency transmitter (44') of each optical receiver unit (22') transmits an encoded signal indicative of a location of the particular optical receiver unit (22') upon which an optical signal is incident.

24 Claims, 7 Drawing Sheets

METHOD AND APPARATUS FOR RECEIVING OPTICAL SIGNALS USED TO DETERMINE VEHICLE VELOCITY

BACKGROUND

1. Field of the Invention

This invention pertains method and apparatus for receiving optical signals used to determine vehicle velocity, and particularly to method and apparatus for receiving laser signals used to determine the velocity of a vehicle.

2. Prior Art and Other Considerations

For decades radar techniques have been utilized to determine the velocity of a vehicle. According to conventional radar techniques, a high frequency (e.g., microwave) carrier wave is directed toward a travelling target vehicle for a period of time. Return energy reflected from the target vehicle is processed to obtain an indication of the velocity of the vehicle.

The widespread use of radar for highway and traffic surveillance has encouraged many motorists to install radar receiver devices (also known as radar detectors) in their vehicles. However, the advent of optical surveillance techniques for traffic speed enforcement has rendered obsolete most radar detection devices. For example, in recent years laser velocity detection devices have been introduced which employ a series of invisible laser light pulses.

One type of such laser velocity detection device is known as Lidar (Light Detection and Ranging), which measure both the range and velocity of vehicular targets. These laser velocity detection devices broadcast a relatively narrow beam which can be more discriminately aimed at a moving vehicle. For the most part, the light pulses broadcast by the laser devices are not detectable by the receivers of conventional radar detection devices.

Therefore, it is an object of the present invention to provide method and apparatus for receiving optical signals used to determine vehicle velocity.

An advantage of the present invention is the provision of method and apparatus for detecting whether optical traffic surveillance techniques are being employed.

Another advantage of the present invention is the provision of an optical receiving method and apparatus operable in conjunction with conventional radar detector devices.

A further advantage of the present invention is the provision of method and apparatus providing an indication of the directionality of the source of traffic surveillance optical signals.

Another advantage of the present invention is the provision of method and apparatus providing multi-field coverage.

Yet another advantage of the present invention is the provision of method and apparatus which accommodates a plurality of ranges of optical wavelengths in detecting whether optical traffic surveillance techniques are being employed.

SUMMARY

Optical receiving system and method are provided for receiving optical signals used to determine vehicle velocity. The receiver system comprises an optical receiver unit mounted on a vehicle to detect an optical signal incident thereupon of the type used to determine the velocity of a vehicle, such as a laser (e.g., Lidar) signal. The optical receiver unit includes a radio frequency transmitter for generating and transmitting a radio frequency signal when the optical receiver unit detects an optical signal incident thereupon.

The detector system further comprises an indicator unit which includes a radio receiver for receiving the radio frequency generated by the radio frequency transmitter and for providing an indication of the reception thereof. In one embodiment, the indicator unit is a conventional radar detection device.

The optical receiver unit includes a background noise filter for determining when the magnitude of the optical signal incident upon the optical receiver unit exceeds optical background noise. The background noise filter includes a calibration circuit whereby the background noise filter can be automatically re-calibrated to take into consideration varying background conditions.

In one embodiment, a plurality of optical receiver units are provided for positioning at differing locations upon a vehicle. The radio frequency transmitter of each optical receiver unit transmits an encoded information signal indicative of a location of the particular optical receiver unit upon which an optical signal is incident. The information signal is received by the indicator unit, which decodes the location information and provides an indication of the directionality of the incident optical signal (e.g., an indication of the location or positioning of the optical receiver unit which was hit with the optical signal).

In another embodiment, the optical receiver unit includes an optical filter which enables an optical receiver unit to detect optical signals in a plurality of predetermined optical wavelength ranges.

In another embodiment, the optical receiver unit includes a linear array of detectors internally or externally located to the optical receiver.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1:
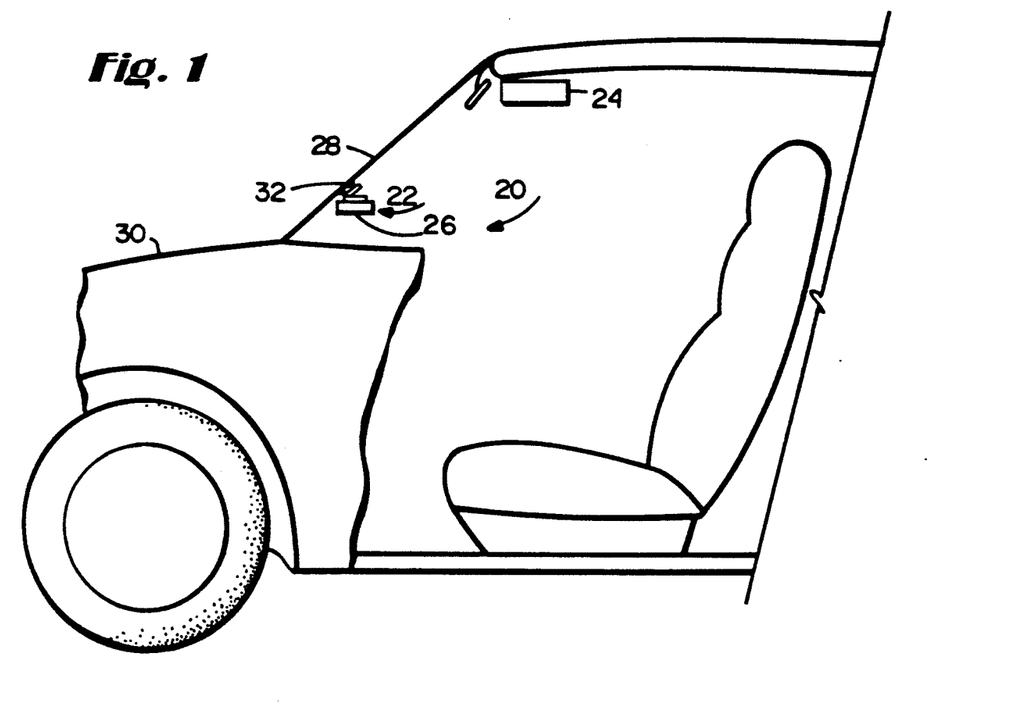
FIG. 1 is a partial side view of a vehicle having installed therein a receiver system according to an embodiment of the invention for receiving optical signals used to determine vehicle velocity.

FIG. 1 shows an optical receiver system 20 which includes an optical receiver unit 22 and a indicator unit 24. The optical receiver unit 22 is housed in a casing 26 which is mounted on a vehicle in a location which is susceptible to targeting by an optical signal. One example of such a location is the lower portion of a windshield 28 of a vehicle 30. The indicator unit 24 is preferably mounted in the interior of the cab of vehicle 30 where it is visible to the vehicle operator, such as in an overhead position as shown in FIG. 1.

Figure 9:
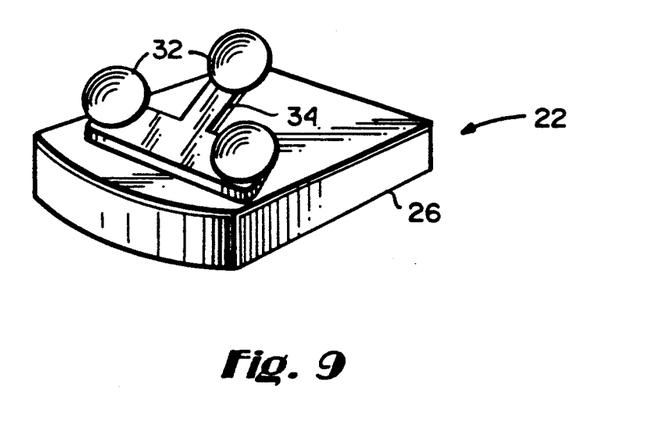
FIG. 9 is an isometric view of an optical receiver unit according to an embodiment of the invention.

As shown in FIG. 9, the casing 26 of the optical receiver unit 22 is preferably rectangular in shape. The casing 26 has an inverted T-shaped attachment bracket 34 pivotally but lockably mounted thereto. The attachment bracket 34 carries suitable mounting means for mounting the optical receiver unit 22 to the vehicle, such as one or more suction cups 32, for example. It should be understood that, in other embodiments, the optical receiver unit 22 is mountable to a vehicle using other attachment means.

Figure 2:
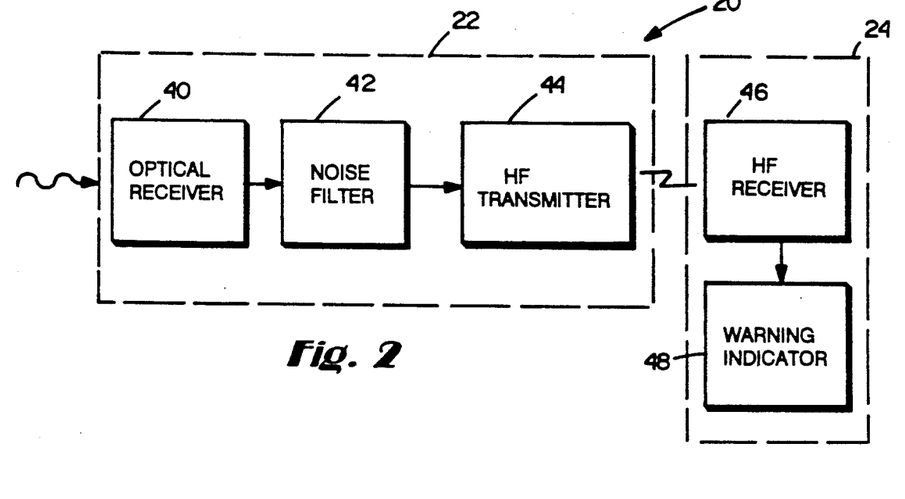
FIG. 2 is a schematic view of the embodiment of FIG. 1.

As shown in FIG. 2, the optical receiver unit 22 includes an optical receiving means, such as optical receiver 40; a noise filter 42; and, a radio frequency transmitting means such as transmitter 44. The indicator unit 24 includes a radio frequency receiver 46 and a warning indicator 48. The warning indicator 48 includes means for providing an audible warning signal, and preferably both an audible warning signal and a visual warning signal.

Figure 3:
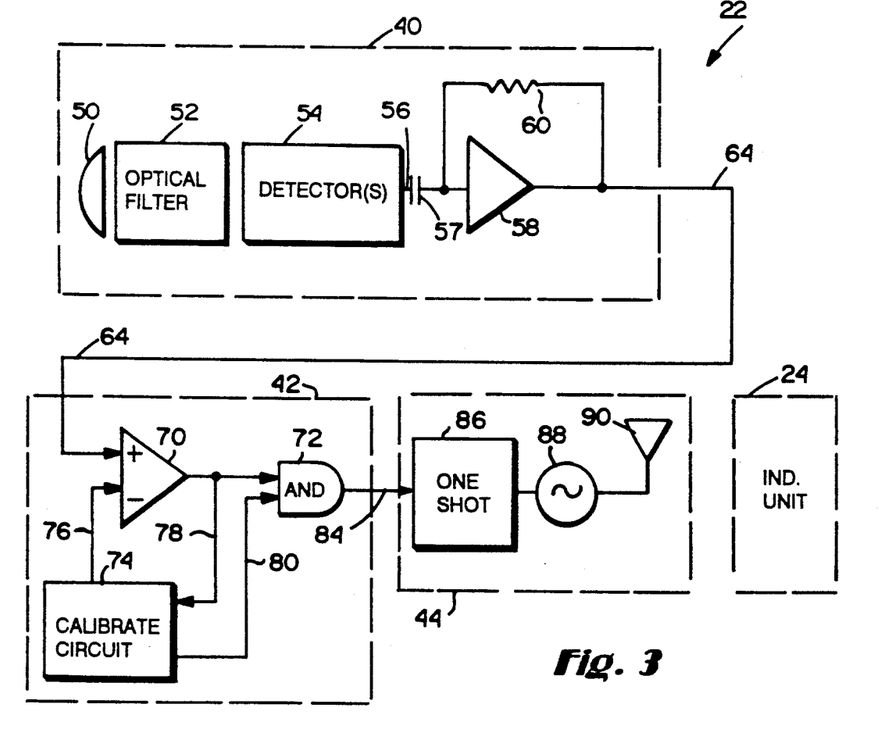
FIG. 3 is a schematic view of a receiver system according to another embodiment of the invention.

FIG. 3 illustrates in greater detail an embodiment of a receiver/broadcasting unit 22. As shown in FIG. 3, the optical receiver 40 includes an optical lens system 50 which directs an optical energy incident thereon to an optical filter 52. (As used herein, the term "incident" refers to energy impinging upon a receiver, regardless of whether the energy emanates directly from a source or is reflected from a source prior to impingement).

The optical filter serves to transmit therethrough to an optical detector element 54 only wavelengths in a predetermined IR optical wavelength band which is characteristic of the filter 52. The optical detector element 54 generates an electrical output signal on line 56. In one embodiment, the detector 54 is a silicon photoelectric PIN or avalanche photodiode device. The magnitude of the electrical output signal on line 56 varies in accordance with the strength of the optical energy incident upon the optical detector element 54.

The electrical output signal on line 56 from the optical detector element 54 is applied through a D.C. blocking capacitor 57 to an amplifier 58. The amplifier 58 has a feedback loop with a resistor 60 provided thereon. An amplified electrical output signal is applied on line 64 to the noise filter 42.

As further shown in FIG. 3, the noise filter 42 includes a comparator 70; an AND gate 72; and, a noise calibration circuit 74. The amplified electrical output signal from the optical receiver 40 on line 64 is applied to a positive input terminal of the comparator 70. A negative input terminal of the comparator 70 is connected by line 76 to receive a threshold voltage thereon signal from the noise calibration circuit 74. An output terminal of the comparator 70 is connected to a first input terminal of the AND gate 72 and to an input terminal (on line 78) of the noise calibration circuit 74. A second input terminal of the AND gate 72 is connected by line 80 to receive a gate control signal from the noise calibration circuit 74. An output terminal of the AND gate 72 is connected by line 84 to the transmitter 44.

Figure 7:
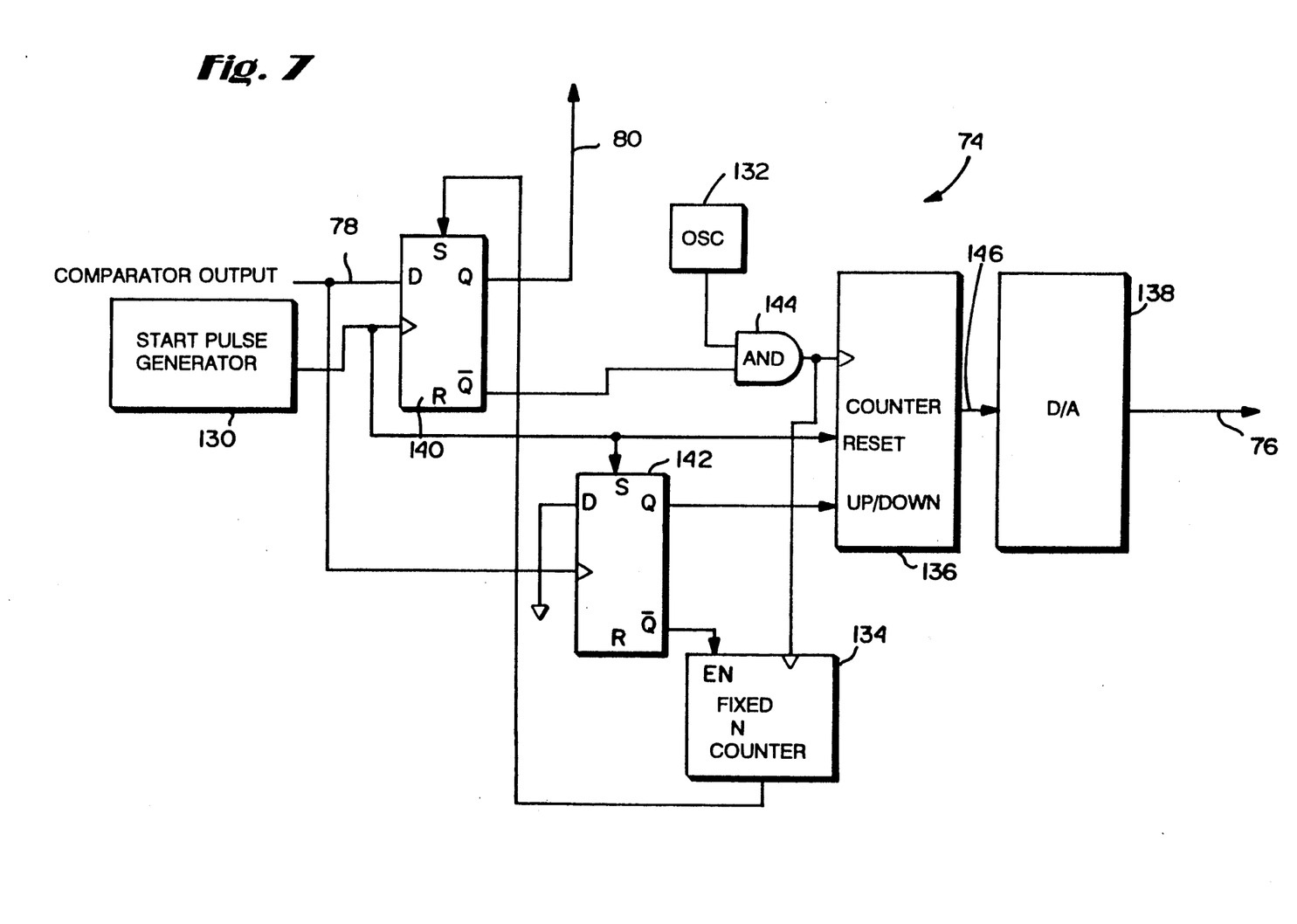
FIG. 7 is a schematic view of a noise calibration system according to an embodiment of the invention.
Figure 8:
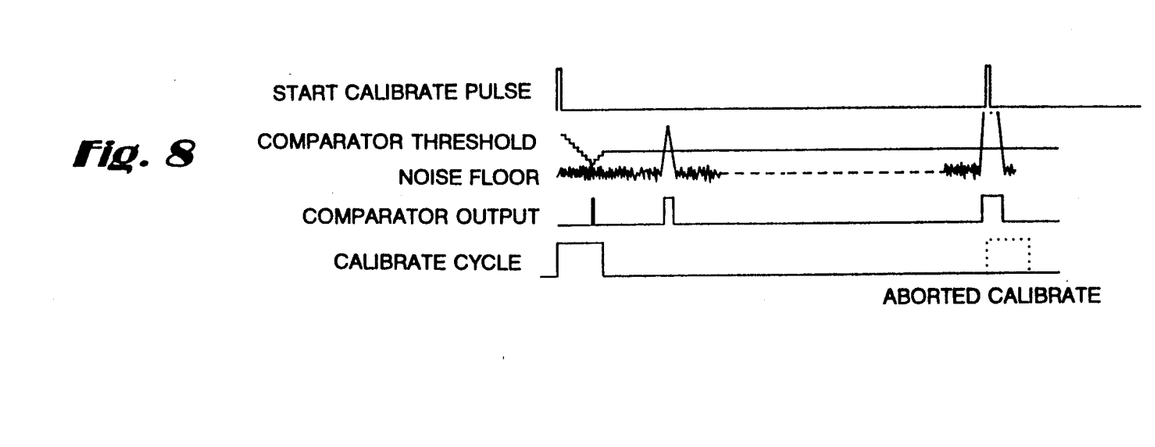
FIG. 8 is a timing diagram showing the operation of the noise calibration system of FIG. 7.

The structure of the noise calibration circuit 74, including the connections of lines 76, 78, and 80, is understood from the detailed description of FIG. 7 provided hereinafter.

The radio frequency transmitter 44 includes a one shot multivibrator 86; a high frequency radio frequency oscillator 88; and, an antenna 90. An input terminal of the one shot 86 is connected to receive the signal gated thereto on line 84 from the AND gate 72. An output terminal of the one shot 86 is connected to an input terminal of the radio frequency oscillator 88. An output terminal of the radio frequency oscillator 88 is connected to the antenna 90. The pulse output of the one shot 86 turns on the oscillator 88. The one shot 86 keeps the oscillator 88 oscillating for a period of time of a duration to ensure activation of the receiver 46 provided in the indicator unit 24. In this regard, the fundamental frequency of the oscillator 88 or one of its harmonics activate the receiver 46.

According to one example of the embodiment of FIG. 2, the indicator unit 24 is a conventional radar detector device. In such embodiment, the high frequency oscillator 88 is an oscillator capable of operating at radar frequencies such as in the X, K, and Ka bands. The high frequency receiver 46 in the indicator unit 24 receives these energies.

Figure 4:
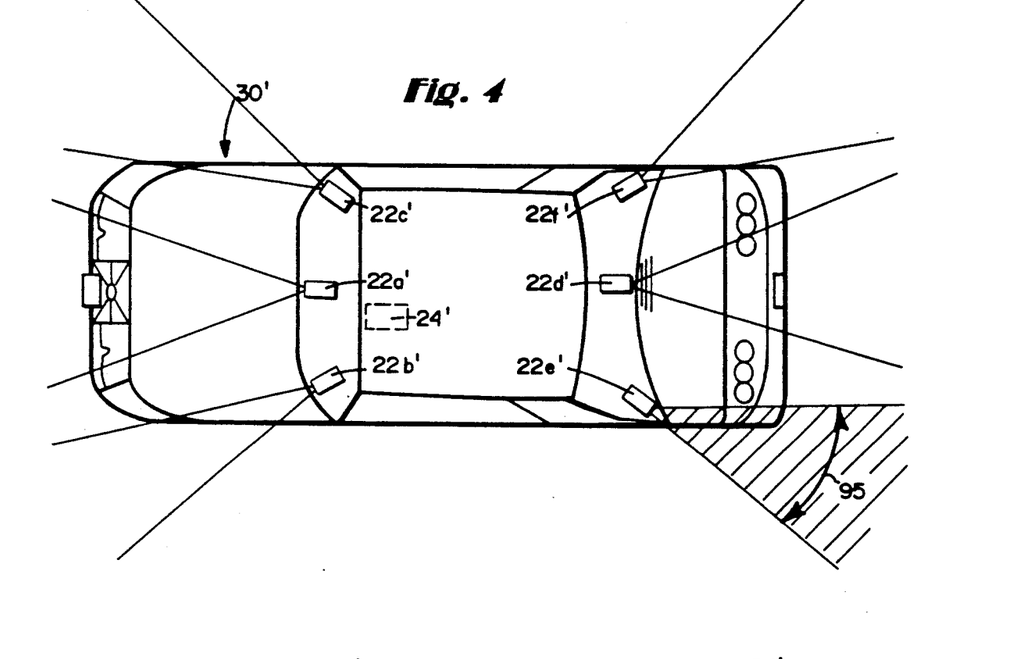
FIG. 4 is a top view of receiver system installed thereon in accordance with a mode of the invention.
Figure 5:
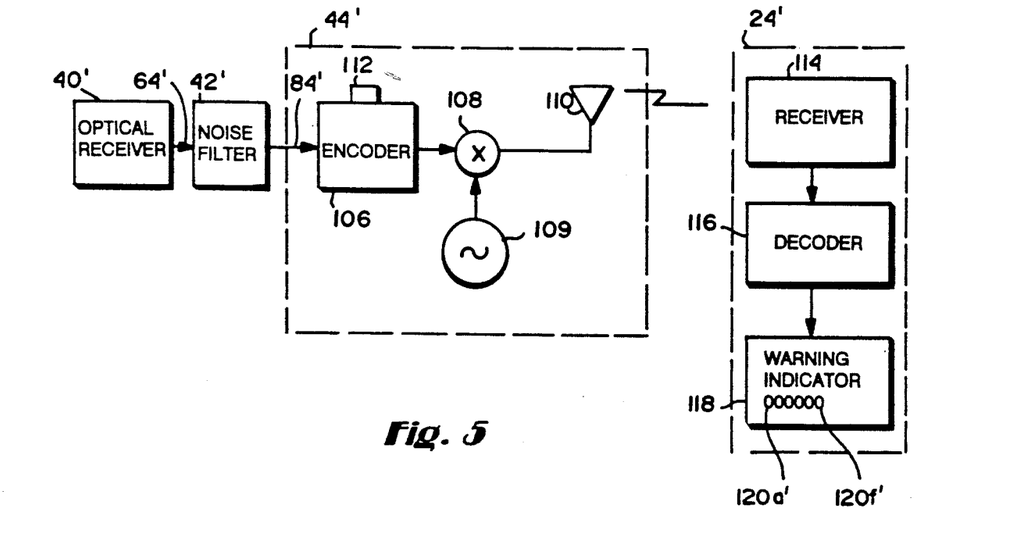
FIG. 5 is a schematic view of a receiver system according to another embodiment of the invention.

FIGS. 4 and 5 illustrate an embodiment of the invention wherein a plurality of optical receiver units 22' are mounted on a vehicle 30'. Each unit 22a', 22b', 22c', 22d' is located at a unique position on the vehicle 30'. Examples of such positions include a front middle windshield position (whereat unit 22a' is positioned); a front left windshield position (whereat unit 22b' is positioned); a front right windshield position (whereat unit 22c' is positioned); a rear middle windshield position (whereat unit 22d' is positioned); a rear left windshield position (whereat unit 22e' is positioned); and, a rear right windshield position (whereat unit 22f' is positioned). As shown in FIG. 4, each unit 22' is positioned to provide detection through an solid angle of space, such as angular volume shown by arrow 95, for example. Accordingly, units 22a', 22b', and 22c' function together to provide coverage across the front of the vehicle 30'; the units 22d', 22e', and 22f' function together to provide coverage across the rear of the vehicle 30';

Each optical receiver unit 22' of the embodiment of FIG. 4 is shown in FIG. 5. The optical receiver units 22' each comprise an optical detector 40'; a noise filter 42'; and, a transmitter 44'. The optical detector 40' and the noise filter 42' of the FIG. 5 embodiment are essentially identical to corresponding unprimed elements of the embodiment of FIG. 3.

The transmitter 44' of the embodiment of FIGS. 4 and 5 includes an encoder 106; a mixer 108; a carrier oscillator 109; and, an antenna 110. An input terminal of the encoder 106 is connected to the line 84 from the noise filter 42. An output terminal of the encoder 106 is connected to a first input terminal of the mixer 108. A second input terminal of the mixer 108 is connected to an output terminal of the oscillator 109. An output terminal of the mixer 108 is connected to the antenna 110.

The oscillator 109 of the transmitter 44' generates an information radio carrier signal which is preferably either 49 MHz or 72 MHz. The encoder 106 is provided with a plurality of switches 112 which are presettable to establish an address or a location information for the unit 22' in which the encoder 106 is included. The carrier is modulated with address or information location (preset via switches 112) to convey the position or location of the unit 22' upon which the optical signal is incident.

The indicator unit 44' of the embodiment of FIG. 4 is also shown in FIG. 5. The indicator unit 24' includes a receiver 114; a decoder 116; and, a warning indicator 118. An input terminal of the decoder 116 is connected to receive an output signal from the receiver 114. The decoder 116 is connected to provide from its output terminal a decoded signal (indicative of the address or location of the particular unit 22' which received the optical signal) to the warning indicator 118. The warning indicator is provided with a plurality of warning indicators, such as indicator LEDs 120a–120f, corresponding to the units 22a'–22f'.

Figure 6:
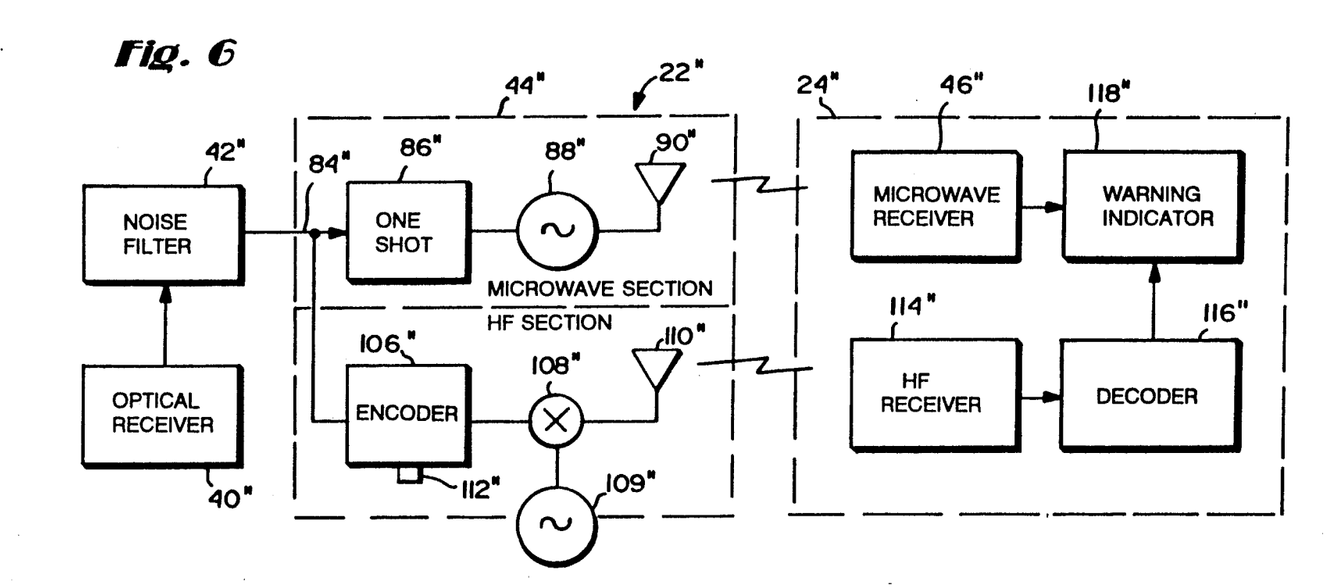
FIG. 6 is a schematic view of a receiver system according to another embodiment of the invention.

FIG. 6 shows a further embodiment of an optical receiving unit 22" and an indicator unit 24". The optical receiver unit 22" includes an optical detector 40"; a noise filter 42"; and, a transmitter 44". The optical detector 40" and the noise filter 42" of the FIG. 6 embodiment are essentially identical to corresponding unprimed elements of the embodiment of FIG. 3.

The transmitter 44" of the embodiment of FIG. 6 includes a microwave section having one shot 86", a microwave oscillator 88"; and, an antenna 90". The microwave section of the transmitter 44" is essentially identical to the transmitter 44 of the embodiment of FIG. 3. The transmitter 44" also includes a high frequency section having an encoder 106"; a mixer 108"; a carrier high frequency oscillator 109"; and, an antenna 110. The high frequency section of the transmitter 44" is essentially identical to the transmitter 44' of the embodiment of FIG. 5. The encoder 106" and the one shot 86" both have their input terminals connected via the line 84" to the output of the noise filter 42".

The indicator unit 24" of the embodiment of FIG. 6 includes two receivers, particularly a microwave receiver 46" and a high frequency receiver 114". The microwave receiver 46" is tuned to receive a fundamental or harmonic of the frequency transmitted by antenna 90"; the high frequency receiver 114" is tuned to receive a fundamental or harmonic of the frequency transmitted by antenna 110". The receiver 46" and the receiver 114" are both connected to a warning indicator 118", with the receiver 114" being connected to the indicator 118" via a decoder 116" in comparable manner as explained previously with respect to the embodiment of FIG. 5. It should also be understood that, in alternate embodiment(s), the receivers 46" and 114" are connected to separate or common warning indicator units, with those warning indicator units being in either the same or separate housings.

Figure 11:
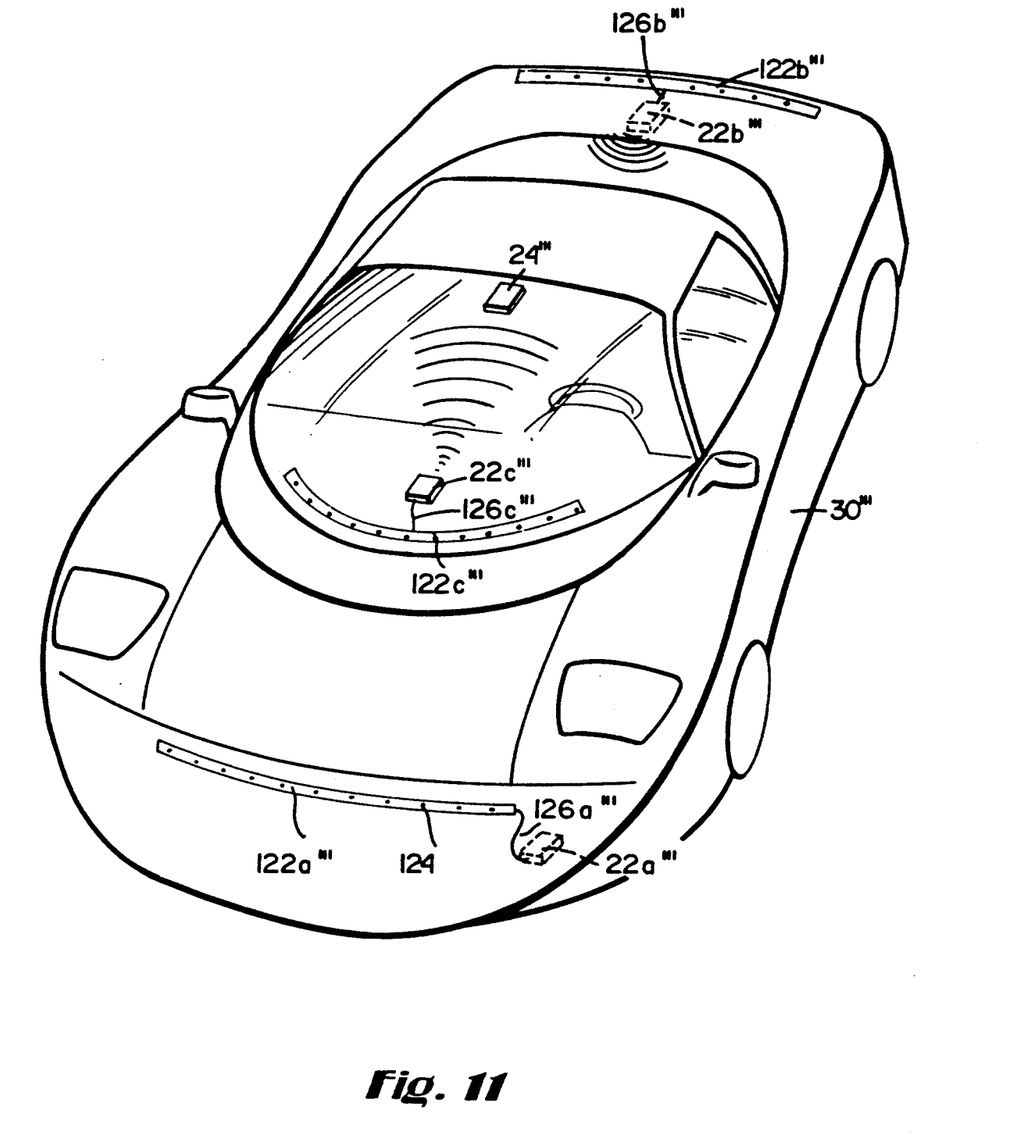
FIG. 11 is an isometric view of receiver system according to another embodiment of the invention including a linear array of detectors.

FIG. 11 shows an embodiment of the invention wherein a plurality of linear detector arrays 122''' are installed on a vehicle. The arrays shown in FIG. 11 include linear detector arrays 122a''' and 122b''' installed on front and rear bumpers, respectively, and linear detector array 122c''' installed on or near the front windshield of a vehicle 30'''. Each linear detector array includes a plurality of light receptors 124. In one embodiment, the light receptors comprise light transmission means for transmitting light incident thereon (via connector cable 126) to the detector element 54 provided in the particular optical receiver unit 22''' to which the array is connected. In another embodiment, each light receptor 124 is an optically conditioned photoelectric detector which applies an electrical signal to its corresponding optical receiver unit 22'''. At the unit 22''' each signal is amplified and applied to a noise filter.

The embodiments of FIG. 11 provide a series of detector elements 124 arrayed in linear fashion to provide multiple fields of view to a common optical receiver. In a variation of the embodiment of FIG. 11, each receptor 124 specifically detects a particular wavelength or wavelength range.

FIG. 7 shows in detail a noise calibration circuit 74 according to an embodiment of the invention. The noise calibration circuit includes a start pulse generator 130; an oscillator 132; a fixed counter 134; an up/down counter 136; a digital-to-analog (D/A) converter 138; first and second D flip flops 140, 142, respectively; and, AND gate 144.

An output pin of the start pulse generator 130 is connected to a clock input terminal of the flip flop 140; to a reset input terminal of the up/down counter 136; and to a set input terminal of the flip flop 142. The line 78 from the output terminal of the comparator 70 is connected both to a D input terminal of the flip flop 140 and to the clock input terminal of the flip flop 142. A Q output terminal of the flip flop 140 is connected by the line 80 to the AND gate 72 (see FIG. 3).

An inverted Q output terminal of the flip flop 140 is connected to a first input terminal of the AND gate 144. A second input terminal of the AND gate 144 is connected to an output terminal of the oscillator 132. An output terminal of the AND gate 144 is connected both to a count input terminal of the up/down counter 136 and to a clock input terminal of the fixed counter 134.

A count overflow output terminal of the fixed counter 134 is connected to a set input terminal of the flip flop 140. An enable input terminal of the fixed counter 134 is connected to an inverted Q output terminal of the flip flop 142.

A Q output terminal of the flip flop 142 is connected to an up/down directionality input terminal of the up/down counter 136. A twelve bit bank of output terminals of the up/down counter 136 is connected by a cable 146 to corresponding input terminals of the digital-to-analog (D/A) converter 138.

Figure 10:
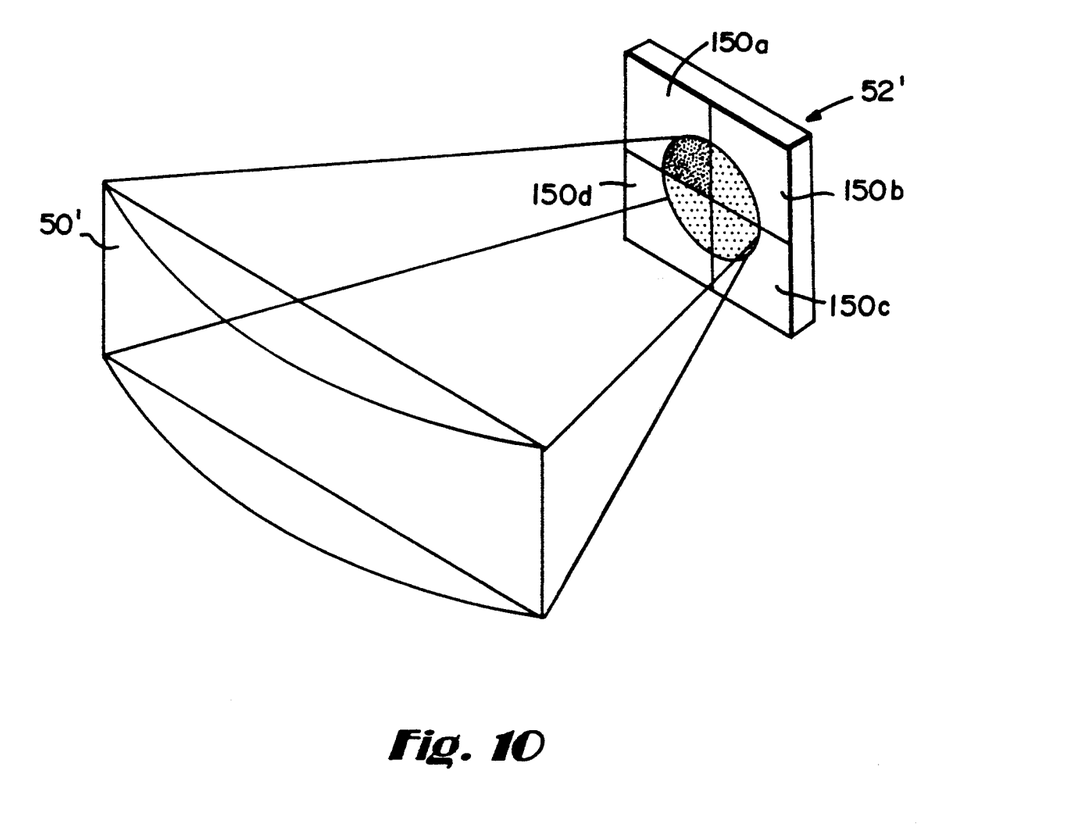
FIG. 10 is an isometric view of an embodiment of an optical filter utilizable with a receiver system of the invention.

In accordance with one embodiment of the invention, FIG. 10 shows a lens 50' together with an optical filter 52'. The lens 50' and filter 52' of FIG. 10 are suitable for facilitating the detection of optical signals in a plurality of optical wavelength ranges. The optical filter 52' has a plurality of segments 150, such as segments 150a, 150b, 150c, and 150d. Each of the segments 150 is fabricated to permit only the transmission of optical wavelengths in one of the predetermined optical wavelength ranges.

The segments 150 are prepared by applying a suitable coating to a light-transmissive substrate, with each segment 150 having a different coating or a coating of different thickness in accordance with the selected wavelength or wavelength range which is desired to be transmitted therethrough. The coatings are applied using controlled thin film deposition according to conventional prior art techniques.

The lens 50' of the embodiment of FIG. 10 is a cylindrical lens of the type having a cylindrical surface upon which an optical signal is incident and a planar surface facing the filter 52'. The curvature of the cylindrical surface is in accordance with the particular angle from which the lens 50" receives incident light, such as the angle depicted by arrow 95 in FIG. 4, for example.

Rather than having a single filter such as the filter 52' of FIG. 10, a plurality of filters are employed in yet another embodiment, with each filter having only one wavelength coating for transmitting therethrough only one select wavelength. All filters can be incident upon a single detector element, or a plurality of detector elements may be provided.

OPERATION

In operation, when background optical noise is incident upon the detector 54, the amplified electrical output of the detector 54 on line 64 does not exceed the noise calibration signal applied on line 76 to the comparator 70. The output of comparator 70 is essentially zero, with the result that no significant signal is gated through gate 72, so that the transmitter 44 is not activated. Hence, background optical noise fails to activate the transmitter 44.

When an optical signal having a predetermined wavelength, such a laser signal, is incident upon the receiver 40, other wavelengths are filtered by the optical filter 52. The filtered optical signal is then incident upon the detector 54. The photoelectric detector 54 converts the incident optical signal to an electrical signal output signal on line 56 having a magnitude which is proportional to the strength of the incident optical signal. The output signal on line 56 is amplified by the amplifier 58 to yield an amplified signal on line 64 which is applied to the noise filter 42.

So long as the noise filter 42 is not in a re-calibrate mode, upon incidence of the laser optical signal on the optical receiver unit 22, the magnitude of the amplified signal on line 64 will exceed the magnitude of the signal on line 76 from the calibration circuit 74. Accordingly, the comparator 70 outputs a high signal to the AND gate 72. When the noise filter 42 is not in a re-calibrate mode, the calibration circuit 74 outputs a high signal on line 80 to the AND gate 72. Accordingly, with two high inputs, the AND gate 72 outputs a high signal on line 84 to the one shot 86 of the transmitter 44.

Upon receiving a high signal from the AND gate 72 of the noise filter 42, the one shot 86 outputs a pulse of a predetermined pulse width to initiate oscillation of the oscillator 88. The oscillator 88 oscillates at a frequency, transmitted by antenna 90, which is receivable by the receiver 46 of the indicator unit 46. That is, the frequency of the oscillator 88, or the harmonics thereof, are chosen for reception by the receiver 46 within the sensitivity range of the receiver 46. The antenna 90 serves to broadcast or transmit a radio signal having the frequency of the oscillator over the airwaves.

As indicated previously, in one embodiment the frequency of the oscillator 88 is a frequency used for radar transmission, such as a microwave frequency in either the X, K, or Ka bands. In another embodiment, the frequency of the oscillator 88 is not a microwave frequency, but rather a high frequency of the type used for typical radio wave transmission.

The radio frequency signal transmitted by antenna 90 of the transmitter 44 is received by the receiver 46 of the indicator unit 24. Upon reception of the radio frequency signal, the HF receiver 46 sends a signal to the warning indicator 48 to cause the warning indicator 48 to provide an alarm. As indicated previously, the alarm can be audible, visible, or both.

Accordingly, when the indicator unit 24 is a conventional radar detector device, the foregoing illustrates how the invention enable the conventional radar detector to also provide an indication of the utilization of optical signals for determining vehicle velocity.

The embodiment of FIG. 4 provides an indication of the directionality of incident optical signals, as well as an indication of the incidence of the optical signals. The operation of each unit 22' of the embodiment of FIG. 4 basically resembles the operation of the embodiment of FIG. 1, excepting the operation of the transmitter 44'.

In the operation of the transmitter 44', upon application of the signal on line 84' to the encoder 106', the encoder 106' applies a digital signal indicative of the value preset by switch 112' to the mixer 108'. The mixer 108' modulates the carrier signal of the oscillator 109' to produce a modulated radio frequency signal that is broadcast by the antenna 110'. The modulated radio frequency signal accordingly carries information relative to the address or location of the unit 22' in which the transmitter 44' is included.

The indicator unit 24' of the embodiment of FIGS. 4 and 5 receives the radio frequency information signal transmitted by the antenna 110' indicative of the address or location of the optical receiver unit 22'. In particular, the receiver 114' of the indicator unit 24' receives the encoded information signal transmitted by antenna 110', and applies the encoded information signal to a decoder 116'. The decoder 116' demodulates the encoded signal and produces an output signal to the warning indicator 118' indicative of the particular optical receiving unit 22' which received the incident optical signal. The warning indicator 118' then produces an alarm and provides an indication of the address or location of the unit 22' which activated the warning indicator 118'. In this regard, the alarm can activate the appropriate one of the LEDs $120a'-120f'$ in accordance with the identity of the particular one of the optical receiving units $22'a-22'f$ which transmitted the radio frequency signal.

Turning now to the embodiment of FIG. 6, the indicator unit 24" not only receives the radio frequency signal transmitted by the antenna 90" indicative of an optical detection, but also the address-modulated radio frequency information signal transmitted by the antenna 110" indicative of the address or location of the activated optical receiver unit 22". In particular, the receiver 114" of the indicator unit 24" receives the encoded information signal transmitted by antenna 110", and applies the encoded information signal to the decoder 116". The decoder 116" demodulates the encoded signal and produces an output signal to the warning indicator 118" indicative of the particular optical receiving unit 22" which received the incident optical signal. The warning indicator 118" then produces an alarm and provides an indication of the address or location of the unit 22" which activated the warning indicator 118", ford example in the manner of the indicator 118 of FIG. 5.

The operation of the automatic threshold bias calibrate circuit 74 of FIG. 7 will now be described with reference to the structure of the system of FIG. 3. The circuit 74 keeps the comparator 70 threshold above the ambient noise floor.

The start pulse generator 130 produces a periodic pulse at predetermined intervals, such as every 1 to 10 seconds. The pulse is synchronized with the comparator 70 output through D-flip flop 140 such that the calibration cycle is inhibited if the comparator output is active. If the comparator is inactive, the start pulse also sets D flip flop 142 to set a count up mode in counter 136. The same pulse resets the counter to its lowest value producing the highest output voltage from the D/A 138 and the highest comparator 70 threshold.

If the comparator output 78 is inactive at the time of the start pulse, oscillator 132 is gated to the counter 136 through gate 144. The counter 136 begins to count up at the oscillator frequency of 5 Khz, the count direction having been set by flip flop 142. The gated oscillator signal is used to clock a fixed N counter 134 when the counter 134 is enabled. Signal 80 is sent to AND gate 72 to inhibit comparator pulses from triggering the one shot 86.

The count proceeds upward while the D/A 138 output drops to the noise threshold of the system. When the D/A 138 output drops below the noise threshold, the comparator 70 is tripped and resets flip flop 142. This reverses the direction of counter 136 causing the D/A 138 output to rise while enabling the fixed-N counter 134. The fixed-N counter 134 permits N positive increments of the D/A 138 output above the noise floor. When the Nth count is reached, flip flop 140 is set, thereby disabling the oscillator 132 input to counter 136 via gate 144. The foregoing re-calibration cycle is repeated on the next start pulse transition from the generator 130.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. Apparatus for determining whether an optical signal is incident thereon from a source which uses the optical signal to determine the velocity of a vehicle, the apparatus comprising:
   optical signal receiving means for detecting an optical signal incident thereupon;
   means for mounting the optical signal receiving means upon the vehicle;
   radio frequency transmission means for generating a radio frequency signal when the optical signal receiving means detects an optical signal incident thereupon; and,
   radio frequency receiving means for receiving the radio frequency generated by the radio frequency transmission means and for providing an indication of the reception thereof, thereby providing an indication of the incidence of the optical signal.

2. The apparatus of claim 1, further comprising:
   filtering means for determining when the magnitude of the optical signal incident upon the optical receiving means exceeds optical background noise, the filtering means being connected to the optical signal receiving means; and wherein the radio frequency transmission means generates a radio frequency signal when the magnitude of the optical signal incident upon the optical signal receiving means exceeds the optical background noise.

3. The apparatus of claim 1, wherein the optical signal receiving means includes means for detecting optical signals in a plurality of optical wavelength ranges.

4. Apparatus for use in combination with a radar reception device of the type which produces a warning indication when a signal in a predetermined range of radio frequencies is incident thereon; the apparatus comprising:
   optical signal receiving means for detecting the incidence of an optical signal thereupon;
   means for mounting the optical signal reception means upon a vehicle; and,
   radio frequency transmission means for generating a radio frequency signal in the predetermined range of the radar reception device when the optical signal receiving means detects the incidence of an optical signal.

5. The apparatus of claim 4, further comprising:
   filtering means for determining when the magnitude of the optical signal incident upon the optical signal receiving means exceeds optical background noise, the filtering means being connected to the optical signal receiving means; and wherein the radio frequency transmission means generates a radio frequency signal when the magnitude of the optical signal incident upon the optical signal receiving means exceeds the optical background noise.

6. The apparatus of claim 4, wherein the optical signal receiving means includes means for detecting optical signals in a plurality of optical wavelength ranges.

7. Apparatus for determining whether an optical signal is incident thereon from a source which uses the optical signal to determine the velocity of a vehicle, the apparatus comprising:
   a plurality of optical signal receiving means for detecting the incidence of an optical signal thereupon;
   mounting means for mounting the plurality of optical signal receiving means upon a vehicle;
   means for generating an information signal when one of the optical signal receiving means detects an optical signal incident thereupon, the information signal including an indication of which of the plurality of optical signal receiving means has the optical signal incident thereupon;
   signal receiving means for detecting the information signal and for providing an indication of which of the optical signal receiving means has the optical signal incident thereupon.

8. The apparatus of claim 7, wherein the signal generating means comprises radio frequency transmission means for generating a radio frequency information signal when one of the optical signal receiving means detects an optical signal incident thereupon, the radio frequency information signal including an indication of which of the plurality of optical signal receiving means has the optical signal incident thereupon; and wherein the information signal receiving means comprises radio frequency receiving means for receiving the radio frequency signal generated by the radio frequency transmission means and for providing an indication of which of the optical signal receiving means has the optical signal incident thereupon.

9. The apparatus of claim 8, wherein the radio frequency transmission means includes encoder means for including in the a radio frequency information signal unique identifying information associated with a particular one of the optical signal receiving means which has the optical signal incident thereupon; and wherein the radio frequency receiving means includes decoder means for decoding the unique identifying information.

10. The apparatus of claim 7, further comprising:
filtering means for determining when the magnitude of the optical signal incident upon the optical signal receiving means exceeds optical background noise, the filtering means being connected to the optical signal receiving means; and wherein the signal generated means generates an information signal when the magnitude of the optical signal incident upon the optical signal receiving means exceeds the optical background noise.

11. The apparatus of claim 7, wherein the optical signal receiving means includes means for detecting optical signals in a plurality of optical wavelength ranges.

12. Apparatus for determining whether an optical signal is incident thereon from a source which uses the optical signal to determine the velocity of a vehicle, the apparatus comprising:
optical signal receiving means for detecting the incidence of an optical signal thereupon, the optical signal receiving means includes means for detecting optical signals in a plurality of predetermined optical wavelength ranges;
means for mounting the optical signal receiving means upon a vehicle;
radio frequency transmission means for generating a radio frequency signal when the optical signal receiving means detects an optical signal in one of the predetermined optical wavelength ranges incident thereupon; and,
radio frequency receiving means for receiving the radio frequency generated by the radio frequency transmission means and for providing an indication of the reception thereof.

13. The apparatus of claim 12, wherein the means for receiving optical signals in a plurality of predetermined optical wavelength ranges comprises an optical filter having a plurality of segments, each of the segments being constructed for permitting the transmission of optical wavelengths in one of the predetermined optical wavelength ranges.

14. The apparatus of claim 12, further comprising:
filtering means for determining when the magnitude of the optical signal incident upon the detecting means exceeds optical background noise, the filtering means being connected to the optical signal receiving means; and wherein the radio frequency transmission means generates a radio frequency signal when the magnitude of the optical signal incident upon the optical signal receiving means exceeds the optical background noise.

15. A method for determining whether an optical signal is incident upon a vehicle from a source which uses the optical signal to determine the velocity of the vehicle, the method comprising:
mounting an optical signal receiving means upon a vehicle;
detecting the incidence of an optical signal upon the optical signal receiving means;
generating a radio frequency signal when the optical signal receiving means detects an optical signal incident thereupon;
receiving the radio frequency signal; and,
providing an indication of the reception of the radio frequency signal.

16. The method of claim 15, further comprising:
determining when the magnitude of the optical signal incident upon the optical signal receiving means exceeds optical background noise; and wherein the radio frequency signal is generated when the magnitude of the optical signal incident upon the optical signal receiving means exceeds the optical background noise.

17. The method of 15, wherein the detecting of the optical signal includes detecting optical signals in a plurality of optical wavelength ranges.

18. A method for use in combination with a radar reception device of the type which produces a warning indication when a signal in a predetermined range of radio frequencies is incident thereon; the method comprising:
detecting the incidence of an optical signal upon an optical signal receiving means mounted on a vehicle;
generating a radio frequency signal in the predetermined range of the radar detection device when an optical signal is incident upon the optical signal receiving means.

19. The method of claim 18, further comprising:
determining when the magnitude of the optical signal incident upon the optical signal receiving means exceeds optical background noise; and wherein the radio frequency signal is generated when the magnitude of the optical signal incident upon the optical signal receiving means exceeds the optical background noise.

20. The method of 18, wherein the detecting of the optical signal includes detecting optical signals in a plurality of optical wavelength ranges.

21. A method for determining whether an optical signal is incident upon a vehicle from a source which uses the optical signal to determine the velocity of the vehicle, the method comprising:
mounting a plurality of optical signal receiving means at corresponding unique locations upon a vehicle;
detecting when an optical signal is incident upon one of the optical signal receiving means;
generating a radio frequency information signal when one of the optical signal receiving means detects an optical signal incident thereupon, the radio frequency information signal including an indication of which of the plurality of optical signal receiving means has the optical signal incident thereupon;
receiving the radio frequency information signal; and,
providing an indication of which of the optical signal receiving means has the optical signal incident thereupon.

22. The method of 21, further comprising:
determining when the magnitude of the optical signal incident upon the optical signal receiving means exceeds optical background noise, the filtering means being connected to the optical signal receiving means; and wherein the radio frequency transmission means generates a radio frequency signal when the magnitude of the optical signal incident upon the optical signal receiving means exceeds the optical background noise.

23. The method of 21, wherein the step of generating a radio frequency information signal includes encoding in the a radio frequency information signal unique identifying information associated with a particular one of the optical signal receiving means has the optical signal incident thereupon; and wherein the step of providing an indication of which of the optical signal receiving means has the optical signal incident thereupon includes decoding the unique identifying information.

24. A method for determining whether an optical signal is incident upon a vehicle from a source which uses the optical signal to determine the velocity of the vehicle, the method comprising:

mounting an optical signal receiving means upon a vehicle;

detecting optical signals in a plurality of predetermined optical wavelength ranges using the optical signal receiving means;

generating a radio frequency signal when the optical signal receiving means detects an optical signal in one of the predetermined optical wavelength ranges incident thereupon; and, receiving the radio frequency generated by the radio frequency transmission means and for providing an indication of the detection thereof.

* * * * *